(12) United States Patent  (10) Patent No.: US 7,673,519 B1
Fuhrmann et al.  (45) Date of Patent: Mar. 9, 2010

(54) PRESSURE SENSOR FEATURING OFFSET CANCELLATION AND METHOD OF MAKING

(75) Inventors: Marco Fuhrmann, Gilbert, AZ (US);
Dubravka Bilic, Scottsdale, AZ (US);
Thomas D. Ohe, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 19 days.

(21) Appl. No.: 12/201,211

(22) Filed: Aug. 29, 2008

(51) Int. Cl.
*G01L 9/12* (2006.01)
(52) U.S. Cl. .......................... 73/718; 73/724
(58) Field of Classification Search ....................... None
See application file for complete search history.

(56) References Cited

U.S. PATENT DOCUMENTS

| 5,761,957 A | 6/1998 | Oba et al. |
| 5,969,258 A | 10/1999 | Gerst et al. |
| 6,532,429 B1 | 3/2003 | Brinks et al. |
| 7,526,961 B2 * | 5/2009 | Downie et al. ................ 73/718 |

* cited by examiner

*Primary Examiner*—Andre J Allen (57) ABSTRACT

A pressure sensor includes a first set of electrodes, a second set of electrodes, and a common electrode. The first and second sets of electrodes overlie an insulative surface, wherein the first set of electrodes represent sense capacitor bottom electrodes and the second set of electrodes represent reference capacitor bottom electrodes. The second set of electrodes is configured in an interleaved arrangement with the first set of electrodes, wherein the geometry of individual electrodes of the first set of electrodes substantially matches the geometry of individual electrodes of the second set of electrodes. In addition, the common electrode represents a sense and reference capacitor top electrode that is (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, further wherein an area of a sense membrane portion is greater than an area of a reference membrane portion.

20 Claims, 8 Drawing Sheets

PRESSURE SENSOR FEATURING OFFSET CANCELLATION AND METHOD OF MAKING

BACKGROUND

1. Field

This disclosure relates generally to pressure sensors, and more specifically, to a pressure sensor featuring offset cancellation and a method of making the same.

2. Related Art

Leak detection and leak signal compensation are important features for micro-electromechanical systems MEMS pressure sensors, especially in automotive safety applications. A pressure leak in a MEMS pressure sensor may occur, for example, in response to a cracked membrane. In addition, time to market considerations foster a need for better re-use options between inertial (e.g., gyroscope, accelerometer, etc.) and pressure sensors. For example, a differential pressure sensor that is more robust as a stand alone P-Cell (pressure transducer) connected to any given ASIC (application specific integrated circuit) design that was developed for inertial or pressure sensors is desired.

Accordingly, there is a need for an improved method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As described herein, a semiconductor substrate can be any semiconductor material or combinations of materials, such as gallium arsenide, silicon germanium, silicon-on-insulator (SOI), silicon, monocrystalline silicon, the like, and combinations of the above. The embodiments of the present disclosure are not limited to semiconductor substrates, but can include any suitable substrate for a given pressure sensor application.

According to one embodiment, the pressure sensor architecture of the present disclosure advantageously reduces undesirable temperature effects and/or media effects. The embodiments further allow for development of next generation combo designs, including accelerometers and pressure sensor elements on a single die, while reducing cost, as the pressure sensor itself does not require a circuit on chip any more, but can advantageously re-use existing capacitance-to-voltage (C2V) circuitry on the ASIC side. The embodiments of the present disclosure also advantageously provide offset cancellation for a dual-transducer pressure sensor. In addition, the embodiments further provide for improved leak detection.

According to the embodiments of the present disclosure, the MEMS pressure sensor includes at least the following aspects: (i) the MEMS pressure sensor design is substantially symmetric, (ii) the MEMS pressure sensor design has interleaved reference and sense elements, and (iii) the MEMS pressure sensor design has a common chamber (or cavity), wherein the chamber can include a vacuum chamber or a chamber filled with a suitable gas at a given controlled pressure. Any offset drift needs to match between the interleaved sensors, which is achieved by a substantially symmetric layout of poly runners and substantially identical bottom plates. In other words, matching of any offset drift between the interleaved sensors is achieved by a substantially symmetric layout of poly runners and substantially identical capacitor bottom electrode plates (as will be discussed further herein). In addition, the reference element of the MEMS pressure sensor design is created with a smaller diaphragm width than that of the sense element. Accordingly, this maintains a smallest possible die size and allows for better temperature coefficient (TC) cancellation, compared to increasing a thickness of a top capacitor electrode to create a corresponding reference element.

Furthermore, the MEMS pressure sensor transducer according to the embodiments of the present disclosure is designed to enable differential sensing of pressure and keep capacitive offset drifts substantially identical on both sides (i.e., on each of the sense and reference sides). In one embodiment, the number of bottom capacitor electrodes can include four (4) electrodes, two (2) for the reference portion and two (2) for the sense portion of the pressure transducer. The particular number of bottom electrodes (or electrode plates) for reference and sense can be selected (or adjusted as necessary) according to the requirements of a given MEMS pressure sensor transducer implementation.

Figure 1:
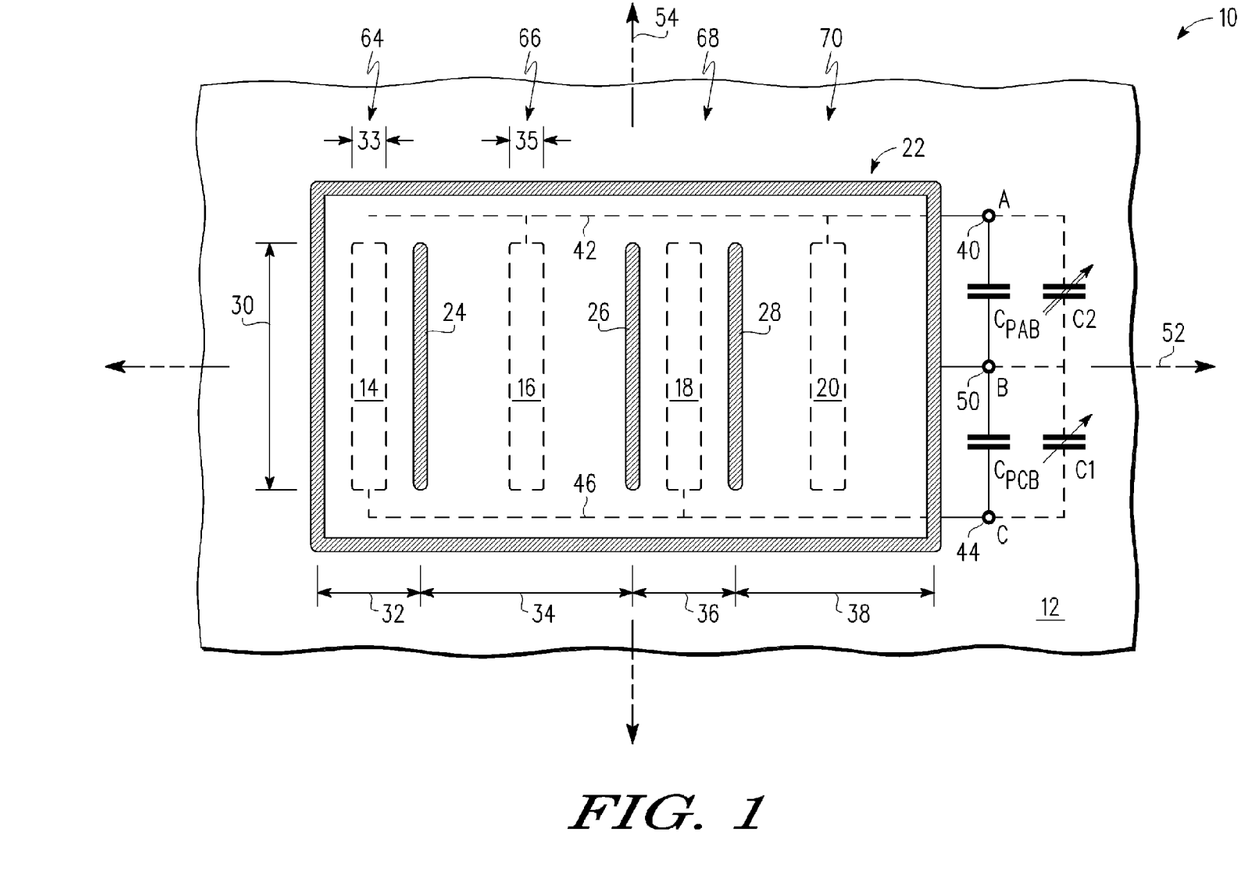
FIG. 1 is a layout top view of a MEMS pressure sensor featuring offset cancellation according to one embodiment of the present disclosure.

Referring now to the figures, FIG. 1 is a layout top view of a MEMS pressure sensor 10 featuring offset cancellation according to one embodiment of the present disclosure. MEMS pressure sensor 10 is fabricated on the surface of an insulative layer 12. Insulative layer 12 can comprise any suitable insulative or dielectric material layer, selected according to the requirements of a given pressure sensor implementation. Electrodes 14, 16, 18 and 20 are formed overlying the surface of insulative layer 12, wherein the electrodes are illustrated in phantom, due to the fact that they are beneath a common electrode 22. Electrodes 16 and 20 represent a first set of sense capacitor bottom electrodes, while electrodes 14 and 18 represent a second set of reference capacitor bottom electrodes. The second set of electrodes (14,18) are configured in an interleaved arrangement with the first set of electrodes (16,20). In addition, in one embodiment, a geometry of individual electrodes of the first set of electrodes (16,20) substantially matches a geometry of individual electrodes of the second set of electrodes (14,18), i.e., the geometries are substantially similar. In another embodiment, the geometry of individual electrodes of the first set of electrodes matches the geometry of the individual electrodes of the second set of electrodes, i.e., the geometries are identical.

In addition, the electrodes (16,20) of the first set of electrodes can each be characterized by a length dimension and a width dimension. The electrodes (14,18) of the second set of electrodes can also be characterized by a length dimension and a width dimension. For example, the length and width dimensions of electrode 14 are represented by the dimension arrows 30 and 33, respectively, in FIG. 1. Similarly, the length and width dimensions of electrode 16 are represented by the dimension arrows 30 and 35, respectively, in FIG. 1. In one embodiment, the length and width dimensions of each of the electrodes (16,20) in the first set of electrodes equals the length and width dimensions of each of the electrodes (14,18) in the second set of electrodes.

Referring still to FIG. 1, common electrode 22 represents a sense and reference capacitor top electrode. The top electrode 22 is (i) overlying, (ii) spaced from, and (iii) configured in connection with the first and second sets of electrodes, (16, 20) and (14,18), respectively, to form a common vacuum cavity (as indicated by reference numeral 90 in FIG. 3 and to be discussed further herein). Common electrode 22 anchors to the surface of the insulative layer 12 for establishing (i) first portions corresponding to the sense membrane portions and (ii) second portions corresponding to the reference membrane portions. For example, in FIG. 1, common electrode 22 anchors to the insulative surface 12 about a perimeter of the common electrode and at desired locations internal to the perimeter, such as indicated by reference numerals 24, 26, and 28, to establish the vacuum cavity and to define the first and second portions. Accordingly, the common electrode 22 includes first portions corresponding to the sense membrane portions, as generally indicated by reference numerals 66 and 70 in FIG. 1 and discussed further herein with reference to FIG. 3. The common electrode 22 also includes second portions corresponding to reference membrane portions, as generally indicated by reference numerals 64 and 68 in FIG. 1 and discussed further herein with reference to FIG. 3. In addition, an area of a sense membrane portion (e.g., portion 66) is greater than an area of a reference membrane portion (e.g., portion 64).

The first portions (66,70) of the common electrode 22 corresponding to the sense membrane portions are each characterized by a length dimension, as generally indicated by dimension arrow 30, and a width dimension, as generally indicated by dimension arrows 34 and 38, respectively. The second portions (64,68) of the common electrode 22 corresponding to the reference membrane portions are each characterized by a length dimension, as generally indicated by dimension arrow 30, and a width dimension, as generally indicated by dimension arrows 32 and 36, respectively. In one embodiment, the length dimension of the first portions (66, 70) equals the length dimension of the second portions (64, 68). In addition, the width dimension 34 of first portion 66 is greater than the width dimension 32 of second portion 64. Furthermore, the width dimension 38 of the first portion 70 is greater than the width dimension 36 of second portion 68.

MEMS pressure sensor 10 further comprises a first conductive node 40, a first conductive runner 42, a second conductive node 44, and a second conductive runner 46. The first conductive runner 42 is electrically coupled to the first set of electrodes (16, 20) and provides electrical access external to the sensor 10 at node 40. The second conductive runner 46 is electrically coupled to the second set of electrodes and provides electrical access external to the sensor at node 44. In addition, the geometry of the first conductive runner 42 substantially matches the geometry of the second conductive runner 46. Furthermore, electrical access to electrode 22 is provided at node 50. In the top view illustration of FIG. 1, the first and second conductive runners, 42 and 46, respectively, are insulated (not shown) from electrode 22 proximate the perimeter of electrode 22 near nodes 40 and 44, respectively.

As further illustrated in FIG. 1, the first and second sets of electrodes, (16,20) and (14,18), respectively, are configured in a layout including an axis of substantial symmetry 52 extending along one dimension of the common electrode 22 and a pattern of repeating first and second sets of electrodes, (16,20) and (14,18), respectively, about another axis 54 along another dimension of the common electrode 22. In one embodiment, the axis of substantial symmetry 52 is perpendicular to axis 54. Furthermore, the first and second conductive runners, 42 and 46, respectively, extend in a direction parallel to the axis of substantial symmetry 52. Still further, in one embodiment, the geometry of the first conductive runner 42 substantially matches the geometry of the second conductive runner 46.

Moreover, in the layout view illustration of FIG. 1, pressure sensor 10 includes capacitors C1 and C2. Capacitor C1 substantially comprises bottom capacitor electrodes (14,18) and corresponding reference membrane portions (64,68) of the common capacitor top plate electrode 22. Capacitor C2 substantially comprises bottom capacitor electrodes (16,20) and corresponding sense membrane portions (66,70) of the common capacitor top plate electrode 22. An important distinction of the MEMS pressure sensor 10 of FIG. 1 is that only the sensitivity between the reference capacitor (C1) and the sense capacitor (C2) is different; whereas offsets and parasitic capacitances (Cp) are ideally identical, and in practice, they are roughly identical (i.e., $Cp_{CB} \approx Cp_{AB}$). The sensitivity differences is achieved by using different top-plate widths (32, 36) for C1 and (34,38) for C2. For example, in FIG. 1, reference capacitor C1 has less sensitivity than sense capacitor C2 because of the narrower top-plate widths (i.e., corresponding to narrower reference membrane portions compared to the sense membrane portions). In one embodiment, the capacitance to voltage (C2V) transfer function for the front end circuit is given by the expression: C2V=C2−C1. In operation, deflection of the sense membrane portions and the reference membrane portions of the common capacitor top plate electrode occurs in response to changes in pressure experienced by the respective membrane portions different from a pressure within the cavity of the pressure sensor.

Figure 2:
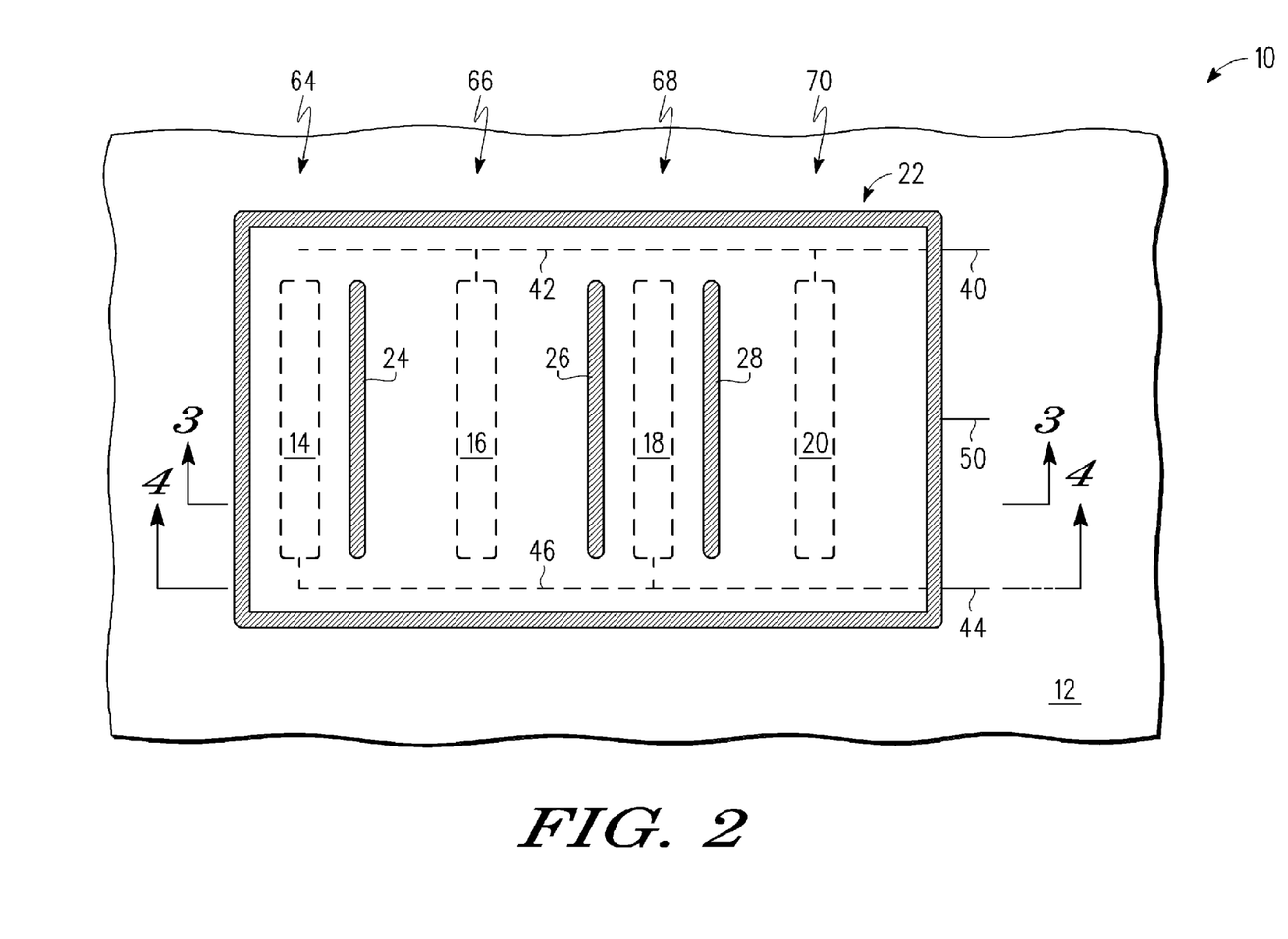
FIG. 2 is a layout top view of the MEMS pressure sensor featuring offset cancellation of FIG. 1, further showing cross-section references, according to one embodiment of the present disclosure.
Figure 3:
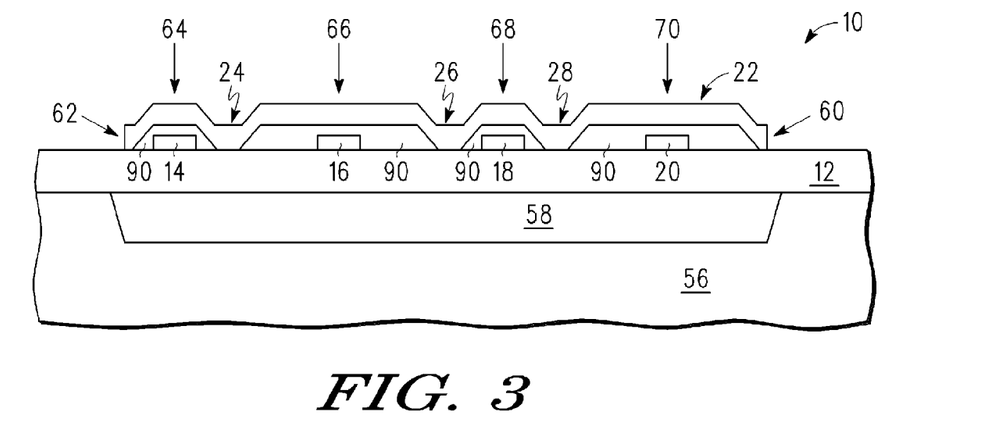
FIG. 3 is a cross-section view of the MEMS pressure sensor featuring offset cancellation of FIG. 2, taken along line 3-3 of FIG. 2, according to one embodiment of the present disclosure.

FIG. 2 is a layout top view of the MEMS pressure sensor 10 featuring offset cancellation of FIG. 1, further showing cross-section references, according to one embodiment of the present disclosure. FIG. 3 is a cross-section view of the MEMS pressure sensor 10 featuring offset cancellation of FIG. 2, taken along line 3-3 of FIG. 2, according to one embodiment of the present disclosure. That is, in one embodiment, MEMS pressure sensor 10 includes a substrate 56. Substrate 56 can comprise any suitable substrate selected according to the requirements of a given MEMS pressure sensor implementation. In one embodiment, substrate 56 comprises a semiconductor substrate. In another embodiment, a doped well region 58 is formed within substrate 56, which underlies the insulative layer 12, the bottom electrodes (14,16,18,20) and the top common electrode 22. As previously discussed, the top electrode 22 is (i) overlying, (ii)

spaced from, and (iii) configured in connection with the first and second sets of electrodes, (16,20) and (14,18), respectively, to form a common vacuum cavity as indicated by reference numeral 90. Common electrode 22 anchors to the surface of insulative layer 12 for establishing (i) first portions (66,70) corresponding to the sense membrane portions and (ii) second portions (64,68) corresponding to the reference membrane portions. In particular, common electrode 22 anchors to the surface of insulative layer 12 about a perimeter of the common electrode (indicated by reference numerals 60,62) and at desired locations internal to the perimeter, such as indicated by reference numerals 24, 26, and 28, to establish the vacuum cavity and to define the first and second portions. In this embodiment, the common electrode 22 is directly anchored to the surface of insulative layer 12.

FIGS. 4-13 are cross-section views of the MEMS pressure sensor featuring offset cancellation of FIG. 2, taken along line 4-4 of FIG. 2, at different stages of manufacture, according to one embodiment of the present disclosure. While the cross-section is taken along one of the conductive runners 46, the processing for other features of sensor 10 such as the bottom electrodes (14,16,18,20), and conductive runner (42) occur concurrently as will be discussed but not illustrated, for brevity. The process of making the MEMS pressure sensor includes forming a patterned insulative layer 12 overlying substrate 56, for example, using any suitable method known in the art. In one embodiment, the substrate 56 comprises an N-type lightly doped phosphorous wafer and patterned insulative layer 12 comprises a field oxide. The field oxide may comprise any suitable thickness, for example, on the order of a few microns (i.e., in the range of 0.5-5.0 µm). In another embodiment, a well region 58 (FIG. 3) is formed within substrate 56 prior or subsequent to formation of insulative layer 12.

Figure 4:
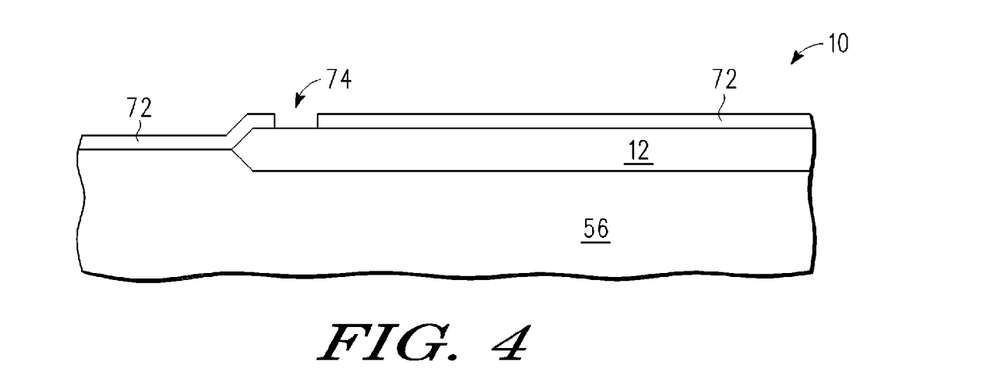
FIGS. 4-13 are cross-section views of the MEMS pressure sensor featuring offset cancellation of FIG. 2, taken along line 4-4 of FIG. 2, at different stages of manufacture, according to one embodiment of the present disclosure.

Subsequent to formation of insulative layer 12, the substrate and insulative layer are processed in preparation for the formation of a substrate contact, for example, using a suitable known HF etch. The process then includes deposition of a first polysilicon layer 72 (or other suitable layer) to a suitable thickness, for example, on the order of hundreds of nanometers (nm) (i.e., in the range of 100-1000 nm). In addition, the first polysilicon layer 72 can be doped according to the requirements of the particular pressure sensor implementation (FIG. 4). For example, in one embodiment, the polysilicon layer 72 is doped with N-type dopant (31P+, 80 keV, 5.05E15). Subsequently, layer 72 is patterned according to the requirements of the given pressure transducer implementation, including for example, to define bottom electrode plates (14,16,18,20) and conductive runners (42,46). In one embodiment, patterning includes providing an opening 74 in layer 72, as will be discussed further herein.

Figure 5:
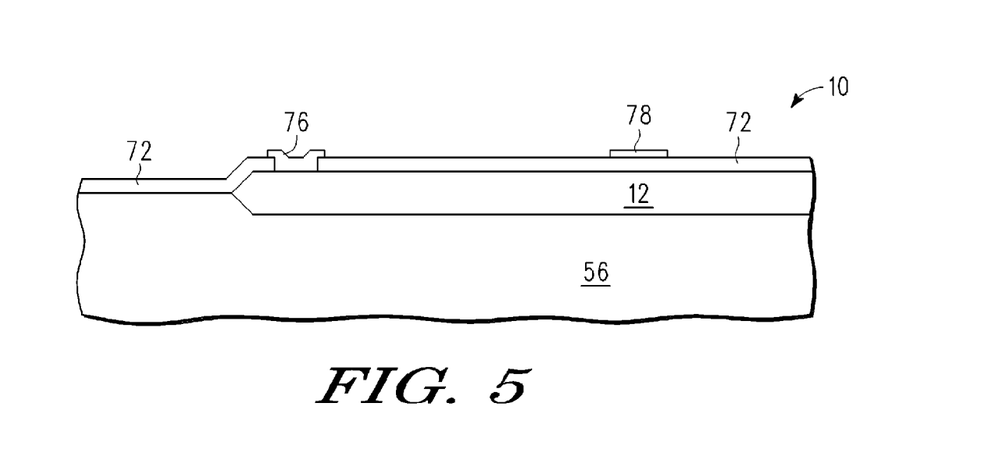

Referring now to FIG. 5, an isolation material is deposited and patterned to form isolation pads 76 and 78. As will be understood herein, the isolation pads provide isolation of the top electrode, as required, from the conductive runners and from the substrate. For example, in one embodiment, the isolation material deposition comprises a silicon rich low stress nitride deposition, having a thickness on the order of hundreds of nanometers (nm) (i.e., in the range of 100-1000 nm). The silicon rich nitride is then patterned to define nitride isolation, such as isolation pads 76 and 78.

Figure 6:
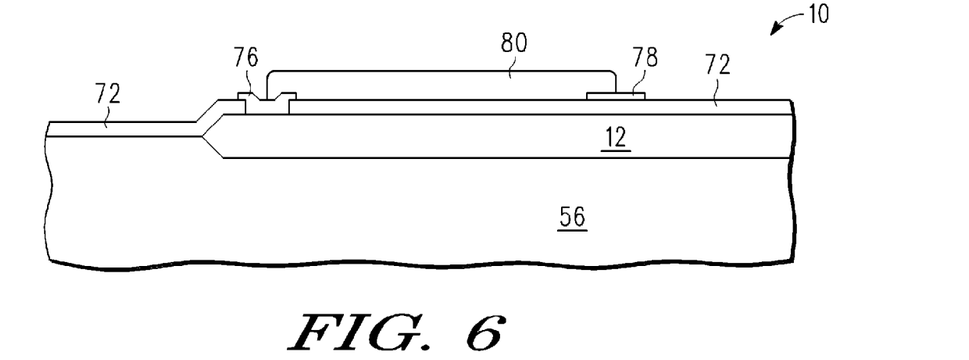

Referring now to FIG. 6, a sacrificial material is deposited and patterned to form gap definition layer 80. Gap definition layer 80 overlies a region that includes a portion of isolation pads 76 and 78, as well as bottom electrode plates (14,16,18, 20) and conductive runners (42,46) which will underlie the subsequently formed top electrode 22. In one embodiment, gap definition layer 80 is removed from regions corresponding to anchors (24,26,28) of the top electrode plate 22 (FIGS. 2,3). In addition, in one embodiment, the sacrificial material deposition comprises a phosphor silicate glass (PSG) deposition, having a thickness in the range of 0.2-2.0 µm. The PSG is then patterned to define gap definition layer 80.

Figure 7:
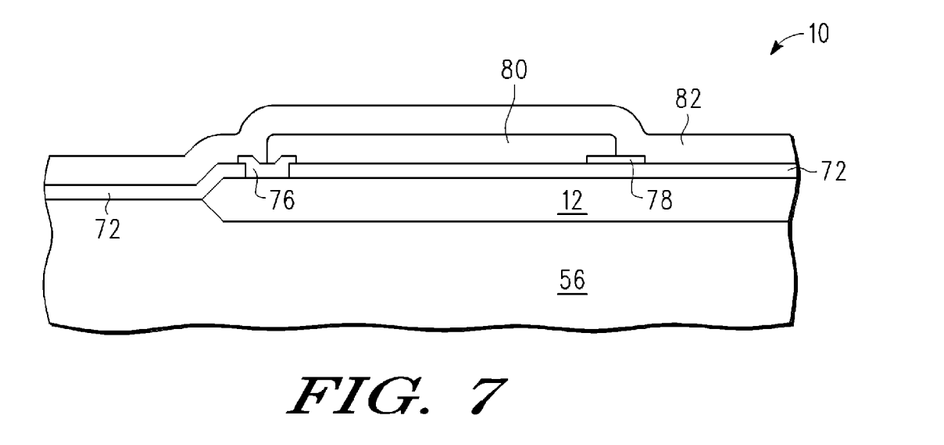
Figure 8:
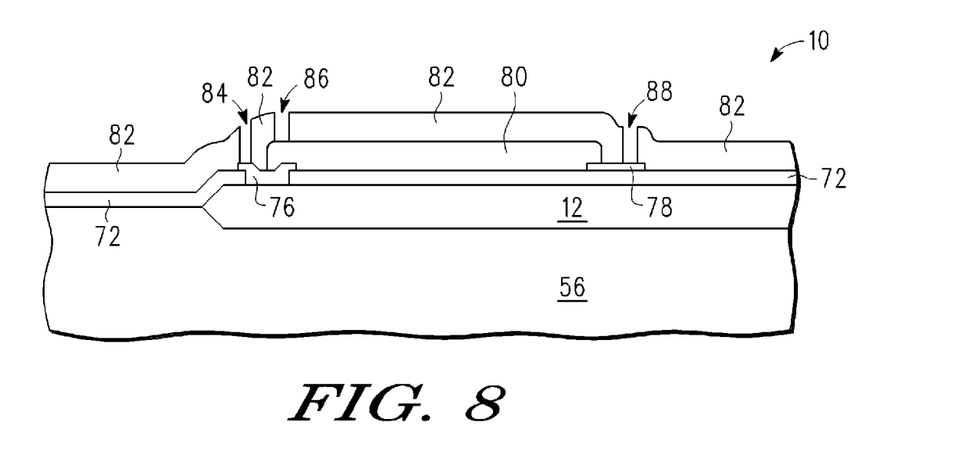

Turning now to FIG. 7, a second polysilicon layer 82 (or other suitable layer) is deposited to a suitable thickness, for example, on the order of a few microns (i.e., 1-20 µm). In addition, the second polysilicon layer 82 can be doped according to the requirements of the particular pressure sensor implementation. For example, in one embodiment, the polysilicon layer 82 is doped with N-type dopant (31P+, 75 keV, 5E15). Subsequently, as illustrated in FIG. 8, layer 82 is patterned according to the requirements of the given pressure transducer implementation, including for example, to define the pressure sensor top electrode plate 22. In one embodiment, patterning includes providing openings 84,88 to define an outer perimeter of electrode plate 22. Openings 84,88 preferably land upon the isolation pads 76,78 so that the portion of polysilicon layer 82 corresponding to the top electrode plate 22 can be decoupled from other portions of layer 82 outside of the perimeter of the top electrode plate 22. Patterning also provides an opening 86 (or more openings as may be required) within the electrode plate 22 which lands on sacrificial layer 80 to provide access for removal of the sacrificial layer 80.

Figure 9:
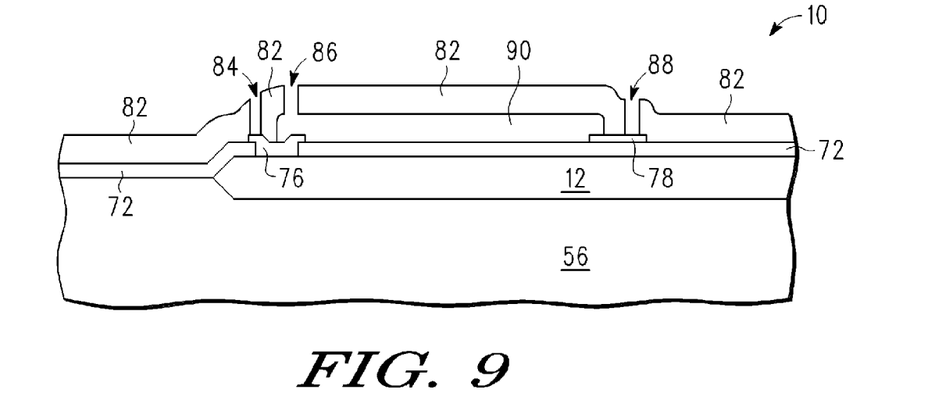

Turning now to FIG. 9, the structure of FIG. 8 is subjected to a suitable diaphragm release etch, wherein sacrificial material 80 is removed while other portions of the structure remain. Removal of sacrificial material 80 creates a void 90, which will subsequently become a sealed pressure cavity for pressure sensor 10. The portion of second polysilicon layer 82 corresponding to the top electrode plate 20 thus becomes a diaphragm membrane for the pressure sensor 10, with the exception of those regions of the top electrode plate that are the anchored portions (24,26,28,60,62) of the top electrode plate 22 (FIGS. 2,3).

Figure 10:
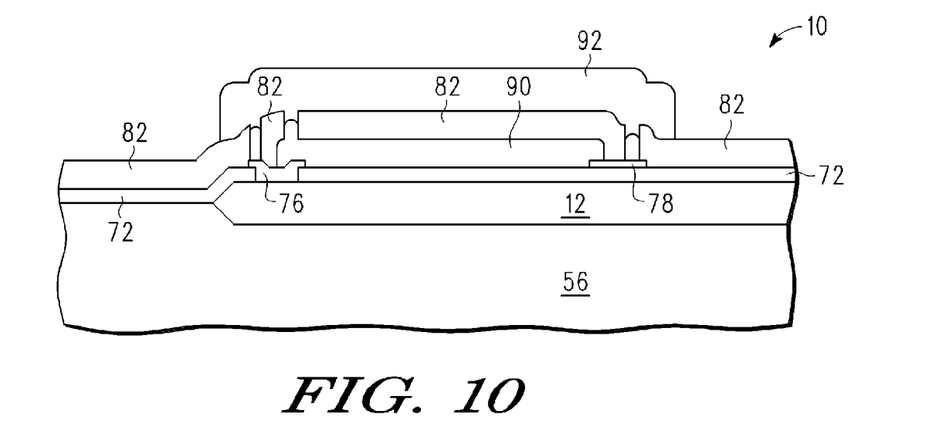

Referring now to FIG. 10, a patterned membrane protection layer 92 is formed overlying the top surface of the second polysilicon layer 82. For example, forming the membrane protection layer 92 can include depositing a tetra-ethyl-orthosilicate (TEOS) material (or other membrane layer protecting material) to a suitable thickness, for example, on the order of a few microns (i.e., 0.5-5.0 µm). Deposition of layer 92 seals the cavity 90, as well as, seals the openings (84,88) around a perimeter of the top electrode plate 22. Sealing of the openings (84,88) around the perimeter of the top electrode plate 22 also provides suitable isolation of the top electrode plate 22 from regions external to plate 22. Subsequently, as illustrated in FIG. 10, layer 92 is patterned according to the requirements of the given pressure transducer implementation, including for example, to define a protected region of the pressure sensor top electrode plate 22 and around a perimeter of the top electrode plate.

Figure 11:
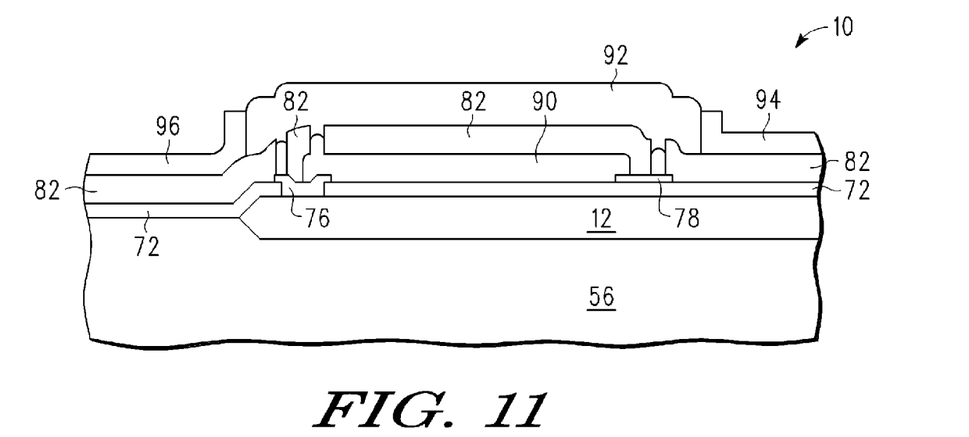

Turning now to FIG. 11, the pressure transducer 10 is processed with a suitable metallization selected according to the requirements of the pressure transducer implementation. For example, in one embodiment, metallization includes deposition of an aluminum silicide (AlSi) (or other metallization material) to a suitable thickness, for example, on the order of a few microns (i.e., 1-20 µm). Subsequently, as illustrated in FIG. 11, the metallization layer is patterned according to the requirements of the given pressure transducer implementation, including for example, to define a capacitor pad 94 of the conductive runner 46 and a substrate contact pad 96.

Figure 12:
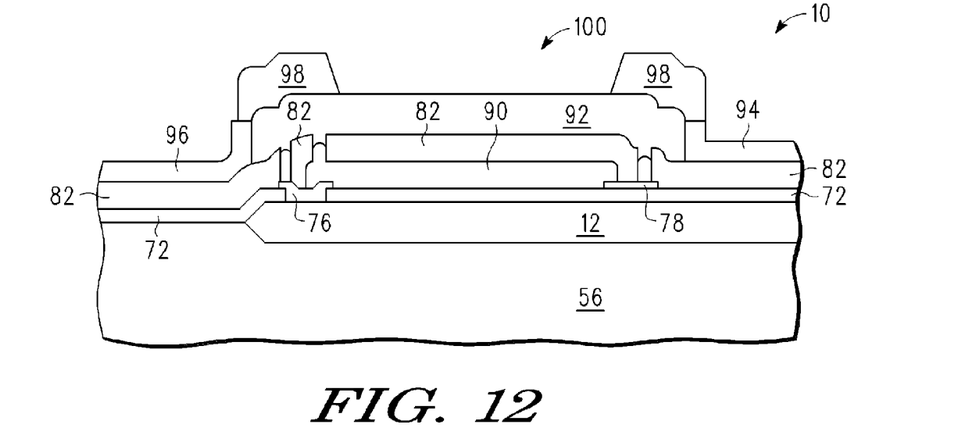
Figure 13:
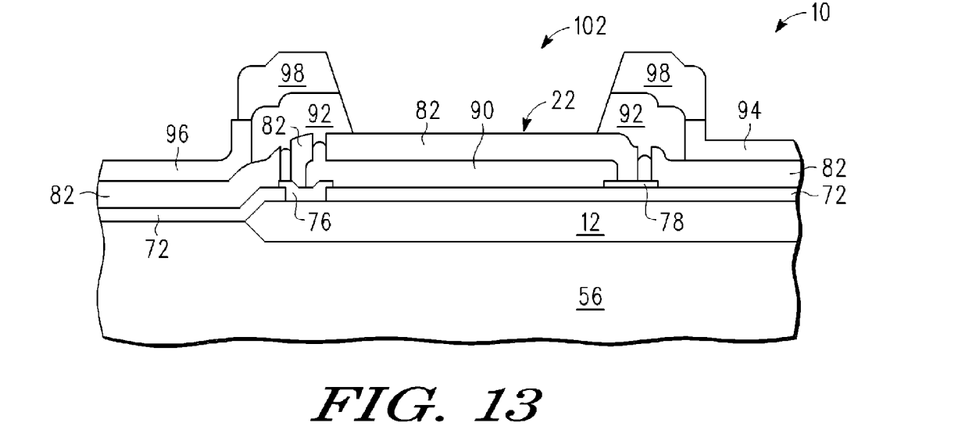

Referring now to FIG. 12, a patterned passivation layer 98 is formed overlying the top surface of membrane protection layer 92 and edge portions of metallization pads 94 and 96. For example, forming the passivation layer 98 can include depositing a silicon oxynitride (SiON) material (or other passivation layer material) to a suitable thickness, for example, on the order of a few microns (i.e., 0.5-5.0 μm). Deposition of layer 98 passivates layer 92, as well as, seals the edges between the metallization pads (94,96) and layer 92 proximate the perimeter of the top electrode plate 22. Subsequently, as illustrated in FIG. 12, layer 98 is patterned according to the requirements of the given pressure transducer implementation, including for example, to define an opening 100 to the membrane protection layer 92 and openings for bond pads (94,96). Subsequently, as shown in FIG. 13, the structure of FIG. 12 is further processed by patterning the membrane protection layer 92 to provide a suitable opening 102 (FIG. 13) via a suitable etch of the exposed portion of membrane protection layer 92 through opening 100 (FIG. 12). The second polysilicon layer 82, acting as a membrane for pressure sensor 10, is thus exposed within opening 102.

Figure 14:
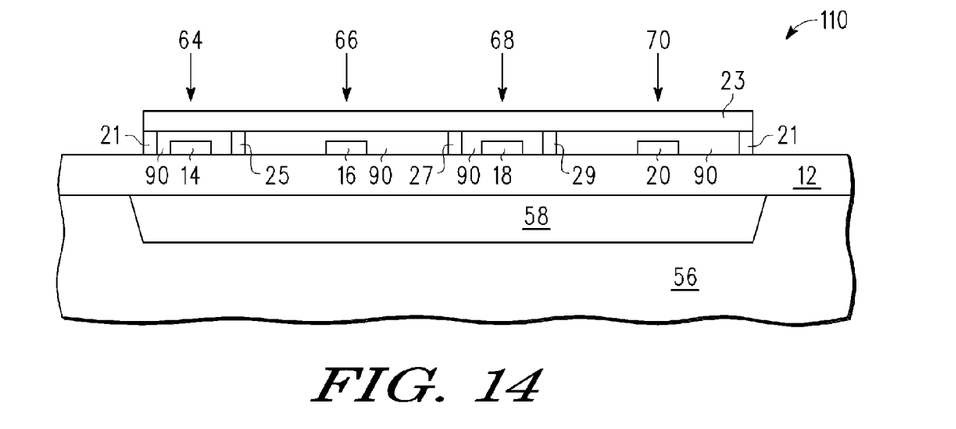
FIG. 14 is a cross-section view of a MEMS pressure sensor featuring offset cancellation, similar to the embodiment of FIG. 2 taken along line 3-3 of FIG. 2, according to another embodiment of the present disclosure.

FIG. 14 is a cross-section view of a MEMS pressure sensor 110 featuring offset cancellation, similar to the embodiment of FIG. 2 taken along line 3-3 of FIG. 2, according to another embodiment of the present disclosure. That is, in one embodiment, MEMS pressure sensor 110 includes a substrate 56. Substrate 56 can comprise any suitable substrate selected according to the requirements of a given MEMS pressure sensor implementation. In one embodiment, substrate 56 comprises a semiconductor substrate. In another embodiment, a doped well region 58 is formed within substrate 56, which underlies the insulative layer 12, the bottom electrodes (14,16,18,20) and the top common electrode 23. The top electrode 23 is (i) overlying, (ii) spaced from, and (iii) configured in connection with the first and second sets of electrodes, (16,20) and (14,18), respectively, to form a common vacuum cavity as indicated by reference numeral 90. Common electrode 23 anchors to the surface of insulative layer 12 via standoff regions (21,25,27,29) for establishing (i) first portions (66,70) corresponding to the sense membrane portions and (ii) second portions (64,68) corresponding to the reference membrane portions. In particular, in this embodiment, common electrode 23 anchors to the insulative surface of dielectric 12 via standoff region 21 about a perimeter of the common electrode and at desired locations internal to the perimeter via standoff regions, such as indicated by reference numerals 25, 27, and 29, to establish the vacuum cavity and to define the first and second portions. Standoff regions 21, 25, 27, and 29 can comprise any suitable standoffs selected according to the requirements of a given pressure transducer implementation. In this embodiment, the common electrode 23 is indirectly anchored to the surface of insulative layer 12.

Figure 15:
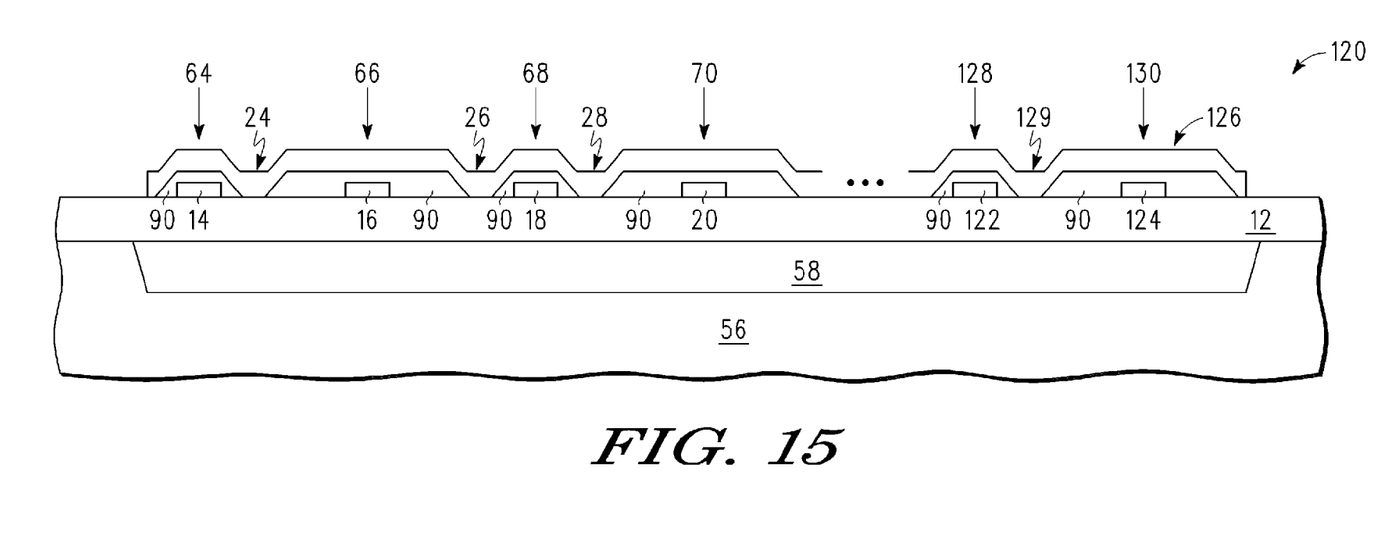
FIG. 15 is a cross-section view of a MEMS pressure sensor featuring offset cancellation, similar to the embodiment of FIG. 2 taken along line 3-3 of FIG. 2, according to yet another embodiment of the present disclosure.

FIG. 15 is a cross-section view of a MEMS pressure sensor 120 featuring offset cancellation, similar to the embodiment of FIG. 2 taken along line 3-3 of FIG. 2, according to yet another embodiment of the present disclosure. This embodiment is similar to the embodiment illustrated in FIG. 3, with differences as discussed in the following. In particular, the bottom electrodes include a plurality of sense capacitor bottom electrodes (16, 20, . . . , 124) and a like plurality of reference capacitor bottom electrodes (14,18, . . . , 122). In addition, from a top layout view perspective, the first and second sets of bottom electrodes are configured in a layout including an axis of substantial symmetry extending along one dimension of the common electrode and a pattern of repeating first and second sets of electrodes about another axis along another dimension of the common electrode 126.

Referring again to FIG. 15, MEMS pressure sensor 120 includes a substrate 56. In one embodiment, the doped well region 58 is formed within substrate 56, which underlies the insulative layer 12, the bottom electrodes (14,16,18,20, . . . , 122,124) and the top common electrode 126. The top electrode 126 is (i) overlying, (ii) spaced from, and (iii) configured in connection with the first and second sets of electrodes, (16,20, . . . , 124) and (14,18, . . . , 122), respectively, to form a common vacuum cavity as indicated by reference numeral 90. Common electrode 126 anchors to the surface of insulative layer 12 for establishing (i) first portions (66,70, . . . , 130) corresponding to the sense membrane portions and (ii) second portions (64,68, . . . , 128) corresponding to the reference membrane portions. In particular, common electrode 126 anchors to the insulative surface 12 about a perimeter of the common electrode (indicated by reference numerals 60,62) and at desired locations internal to the perimeter, such as indicated by reference numerals 24, 26, 28, and 129, to establish the vacuum cavity and to define the first and second portions. In this embodiment, the common electrode 126 is directly anchored to the surface of insulative layer 12.

Figure 16:
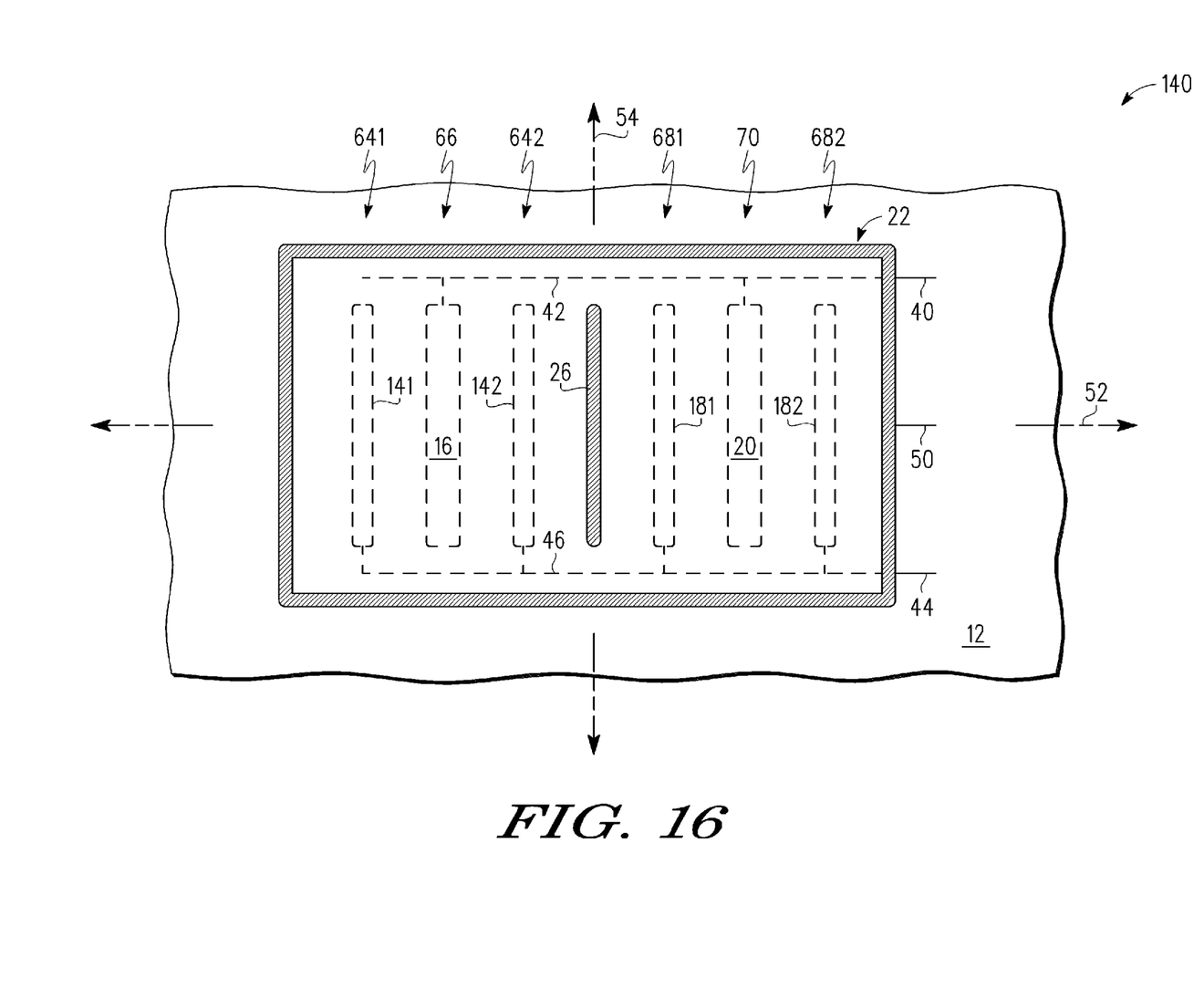
FIG. 16 is a top-down view of a MEMS pressure sensor featuring offset cancellation, similar to the embodiment of FIG. 2, according to still another embodiment of the present disclosure.

FIG. 16 is a top-down view of a MEMS pressure sensor 140 featuring offset cancellation, similar to the embodiment of FIG. 2, according to still another embodiment of the present disclosure. This embodiment is similar to the embodiment of FIG. 2, with differences as discussed in the following. In particular, the geometry of individual electrodes of the second set of electrodes ((141,142), (181,182)) comprises an equivalent geometry. That is, the equivalent geometry of each individual electrode (14 and 18 of FIG. 2) comprises a first half (141 and 181, respectively of FIG. 16) and a second half (142 and 182, respectively of FIG. 16). Each of the first half and second half is positioned opposite sides of a corresponding electrode (16 or 20) of the first set of electrodes (16,20) along a length dimension of the corresponding electrode. In addition, the first portions (641, 642, 681, and 682) of the common electrode 22 corresponding to the first half (141,181) and the second half (142,182) equivalent geometry of individual electrodes of the second set of electrodes (14 and 18 of FIG. 2) effectively share a corresponding percentage of the second portions (66, 70) of the common electrode 22. In other words, first half equivalent geometry electrode 141 is within the first portion 641 of common electrode 22 and second half equivalent geometry electrode 142 is within the first portion 642 of common electrode 22, wherein first portion 641 shares a left-hand side of second portion 66 of common electrode 22 and second portion 642 shares a right-hand side of second portion 66 of common electrode 22. The same applies to first portion 681 and first portion 682 sharing left-hand and right-hand sides, respectively, of second portion 70 of common electrode 22. In one embodiment, each first half equivalent geometry of the individual electrodes of the second set of electrodes effectively shares a first half (e.g. on the order of fifty percent) of a corresponding second portion, and wherein the second half equivalent geometry of the individual electrodes of the second set of electrodes effectively shares a second half (e.g. on the order of fifty percent) of the corresponding second portion.

The inventors have found that changes in offset due to changes in temperature are larger for individual capacitors than for the difference of two capacitors, (i.e., a sense capacitor and a reference capacitor. The capacitor can be modeled by the equation of $C=a*P2+b*P+c$, where capacitance C is in units of (fF), coefficients a, b and c in units of $(fF/kPa^2)$, (fF/kPa), and (fF), respectively, and P is pressure in units of (kPa). In addition, depositing a media protection coating (such as any suitable gel) on a P-cell according to the embodiments of the present disclosure results in a substantially uniform offset change. In other words, offset deviation improves on the order of approximately eighty percent (~80%) when taking a difference of two capacitances of different sensitivities as compared to an offset of one capacitor alone. Furthermore, leak detection can be determined by the observation of any sensitivity change, caused, for example, by a pressure leak. In response to detection of the sensitivity change, the sensor output can be corrected accordingly.

The embodiments of the present disclosure advantageously combines offset cancellation and slow leak detection on a system level. In particular, the embodiments provide a single sensor architecture featuring offset cancellation and an option for system level slow leak detection by matching an offset through the interleaved pressure sensor element design as discussed herein. The pressure sensor can be configured to implement pseudo differential and differential pressure sensing is response to being coupled to a differential circuit having a transfer function of C2-C1. In one embodiment, the MEMS pressure sensor comprises an interleaving arrangement of two pressure sensor elements with different sensitivity, wherein the pressure sensor elements share the same pressure cavity. In other words, in one embodiment, a single pressure cavity is common to all of the pressure sensor elements of the MEMS pressure sensor.

The embodiments of the present disclosure further provide for a more robust design that yields improved performance over a life time in harsh environments and improved fault detection capability on a system level with possible self correction. The embodiments also provide for better re-use of ASIC front end circuit designs between inertial and pressure sensors. For example, the embodiments of the present disclosure can be implemented into any given pressure sensor or combo device (e.g., accelerometer plus pressure sensor elements on one die without circuitry).

By now it should be appreciated that there has been provided a pressure sensor comprising: a first set of electrodes overlying an insulative surface; a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes; and a common electrode (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, further wherein an area of a sense membrane portion is greater than an area of a reference membrane portion.

In one embodiment, the geometry of individual electrodes of the first set of electrodes matches the geometry of the individual electrodes of the second set of electrodes. In another embodiment, the electrodes of the first set of electrodes are each characterized by a length dimension and a width dimension, the electrodes of the second set of electrodes are each characterized by a length dimension and a width dimension, and the length and width dimensions of each of the electrodes in the first set of electrodes equals the length and width dimensions of each of the electrodes in the second set of electrodes.

In another embodiment, the first set of electrodes comprise sense capacitor bottom plate electrodes, the second set of electrodes comprise reference capacitor bottom plate electrodes, and the common electrode comprises a capacitor top plate electrode in common with the sense and reference capacitor bottom plate electrodes. In yet another embodiment, the first and second sets of electrodes are configured in a layout including an axis of substantial symmetry extending along one dimension of the common electrode and a pattern of repeating first and second sets of electrodes about another axis along another dimension of the common electrode. Still further, the device comprises: a first conductive runner electrically coupled to the first set of electrodes, and a second conductive runner electrically coupled to the second set of electrodes, wherein a geometry of the first conductive runner substantially matches a geometry of the second conductive runner, further wherein the first and second conductive runners extend in a direction parallel to the axis of substantial symmetry. Moreover, the geometry of the first conductive runner substantially matches the geometry of the second conductive runner.

In yet another embodiment, the first portions of the common electrode corresponding to the sense membrane portions are each characterized by a length dimension and a width dimension, the second portions of the common electrode corresponding to the reference membrane portions are each characterized by a length dimension and a width dimension, wherein the length dimension of the first portions equals the length dimension of the second portions, and wherein the width dimension of the first portions is greater than the width dimension of the second portions. In a further embodiment, the common electrode anchors to the insulative surface for establishing (i) the first portions corresponding to the sense membrane portions and (ii) the second portions corresponding to the reference membrane portions. In addition, the common electrode is one of (i) directly anchored to the dielectric surface or (ii) indirectly anchored to the dielectric surface. In one embodiment, the first set of electrodes includes two electrodes, and wherein the second set of electrodes includes two electrodes.

In a still further embodiment, the geometry of individual electrodes of the second set of electrodes comprises an equivalent geometry, wherein the equivalent geometry of each individual electrode comprises a first half and a second half, wherein each of the first half and second half is positioned opposite sides of a corresponding electrode of the first set of electrodes along a length dimension of the corresponding electrode. The first portions of the common electrode correspond to the first half and the second half equivalent geometry of individual electrodes of the second set of electrodes effectively share a corresponding percentage of the second portions of the common electrode. In another embodiment, each first half equivalent geometry of the individual electrodes of the second set of electrodes effectively shares a first half of a corresponding second portion, and wherein the second half equivalent geometry of the individual electrodes of the second set of electrodes effectively shares a second half of the corresponding second portion.

In yet another embodiment, the device further comprises: a semiconductor substrate including an doped well region, and wherein the insulative surface comprises a surface of a dielectric layer overlying the doped well region of the semiconductor substrate, further wherein the first set of electrodes, the second set of electrodes, and the common electrode also overly the doped well region of the substrate.

In another embodiment, a pressure sensor, comprises: a first set of electrodes overlying an insulative surface; a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes, further wherein the first and second sets of electrodes are configured in a layout including an axis of substantial symmetry; a first conductive runner electrically coupled to the first set of electrodes; a second conductive runner electrically coupled to the second set of electrodes, wherein a geometry of the first conductive runner substantially matches a geometry of the second conductive runner, further wherein the first and second conductive runners extend in a direction parallel to the axis of substantial symmetry; and a common electrode (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, wherein an area of a sense membrane portion is greater than an area of a reference membrane portion, wherein the axis of substantial symmetry extends along one dimension of the common electrode and a pattern of repeating first and second sets of electrodes extends about another axis along another dimension of the common electrode, and wherein the common electrode anchors to the insulative surface for establishing (i) the first portions corresponding to the sense membrane portions and (ii) the second portions corresponding to the reference membrane portions.

In yet another embodiment, a method of making a pressure sensor, comprises: forming a first set of electrodes overlying an insulative surface; forming a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes; and forming a common electrode (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, further wherein an area of a sense membrane portion is greater than an area of a reference membrane portion. In one embodiment, forming the first and second sets of electrodes comprises configuring the first and second sets of electrodes in a layout including an axis of substantial symmetry extending along one dimension of the common electrode and repeating a pattern of the first and second sets of electrodes along another dimension of the common electrode. In addition, in another embodiment, prior to forming the common electrode, the method further comprises: forming a first conductive runner electrically coupled to the first set of electrodes overlying the insulative surface; and forming a second conductive runner electrically coupled to the second set of electrodes overlying the insulative surface, wherein a geometry of the first conductive runner substantially matches a geometry of the second conductive runner, further wherein the first and second conductive runners extend in a direction parallel to the axis of substantial symmetry. Furthermore, forming the common electrode further includes anchoring the common electrode to the insulative surface for establishing (i) the first portions corresponding to the sense membrane portions and (ii) the second portions corresponding to the reference membrane portions.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, the embodiments of the present disclosure could be implemented in connection with any capacitive pressure sensor implementation (e.g., MEMS and other than MEMS), whether stand-alone or in a combination (inertial and pressure sensor) implementation. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A pressure sensor, comprising:
   a first set of electrodes overlying an insulative surface;
   a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes; and
   a common electrode (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, further wherein an area of a sense membrane portion is greater than an area of a reference membrane portion.

2. The device of claim 1, wherein the geometry of individual electrodes of the first set of electrodes matches the geometry of the individual electrodes of the second set of electrodes.

3. The device of claim 2, further wherein the electrodes of the first set of electrodes are each characterized by a length dimension and a width dimension, the electrodes of the second set of electrodes are each characterized by a length dimension and a width dimension, and further wherein the length and width dimensions of each of the electrodes in the first set of electrodes equals the length and width dimensions of each of the electrodes in the second set of electrodes.

4. The device of claim 1, wherein the first set of electrodes comprise sense capacitor bottom plate electrodes, the second set of electrodes comprise reference capacitor bottom plate electrodes, and the common electrode comprises a capacitor top plate electrode in common with the sense and reference capacitor bottom plate electrodes.

5. The device of claim 1, wherein the first and second sets of electrodes are configured in a layout including an axis of substantial symmetry extending along one dimension of the common electrode and a pattern of repeating first and second sets of electrodes about another axis along another dimension of the common electrode.

6. The device of claim 5, further comprising:
a first conductive runner electrically coupled to the first set of electrodes; and
a second conductive runner electrically coupled to the second set of electrodes, wherein a geometry of the first conductive runner substantially matches a geometry of the second conductive runner, further wherein the first and second conductive runners extend in a direction parallel to the axis of substantial symmetry.

7. The device of claim 6, wherein the geometry of the first conductive runner substantially matches the geometry of the second conductive runner.

8. The device of claim 1, wherein the first portions of the common electrode corresponding to the sense membrane portions are each characterized by a length dimension and a width dimension, the second portions of the common electrode corresponding to the reference membrane portions are each characterized by a length dimension and a width dimension, wherein the length dimension of the first portions equals the length dimension of the second portions, and wherein the width dimension of the first portions is greater than the width dimension of the second portions.

9. The device of claim 1, wherein the common electrode anchors to the insulative surface for establishing (i) the first portions corresponding to the sense membrane portions and (ii) the second portions corresponding to the reference membrane portions.

10. The device of claim 1, wherein the common electrode is one of (i) directly anchored to the dielectric surface or (ii) indirectly anchored to the dielectric surface.

11. The device of claim 1, wherein the first set of electrodes includes two electrodes, and wherein the second set of electrodes includes two electrodes.

12. The device of claim 1, wherein the geometry of individual electrodes of the second set of electrodes comprises an equivalent geometry, wherein the equivalent geometry of each individual electrode comprises a first half and a second half, wherein each of the first half and second half is positioned opposite sides of a corresponding electrode of the first set of electrodes along a length dimension of the corresponding electrode.

13. The device of claim 12, further wherein the first portions of the common electrode corresponding to the first half and the second half equivalent geometry of individual electrodes of the second set of electrodes effectively share a corresponding percentage of the second portions of the common electrode.

14. The device of claim 13, further wherein each first half equivalent geometry of the individual electrodes of the second set of electrodes effectively shares a first half of a corresponding second portion, and wherein the second half equivalent geometry of the individual electrodes of the second set of electrodes effectively shares a second half of the corresponding second portion.

15. The device of claim 1, further comprising:
a semiconductor substrate including an doped well region, and wherein the insulative surface comprises a surface of a dielectric layer overlying the doped well region of the semiconductor substrate, further wherein the first set of electrodes, the second set of electrodes, and the common electrode also overly the doped well region of the substrate.

16. A pressure sensor, comprising:
a first set of electrodes overlying an insulative surface;
a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes, further wherein the first and second sets of electrodes are configured in a layout including an axis of substantial symmetry;
a first conductive runner electrically coupled to the first set of electrodes;
a second conductive runner electrically coupled to the second set of electrodes, wherein a geometry of the first conductive runner substantially matches a geometry of the second conductive runner, further wherein the first and second conductive runners extend in a direction parallel to the axis of substantial symmetry; and
a common electrode (i) overlying, (ii) spaced from, and (iii) configured in connection with the first and second sets of electrodes to form a common pressure cavity,
wherein the common electrode includes first portions corresponding to sense membrane portions and second portions corresponding to reference membrane portions,
wherein an area of a sense membrane portion is greater than an area of a reference membrane portion,
wherein the axis of substantial symmetry extends along one dimension of the common electrode and a pattern of repeating first and second sets of electrodes extends about another axis along another dimension of the common electrode, and
wherein the common electrode anchors to the insulative surface for establishing (i) the first portions corresponding to the sense membrane portions and (ii) the second portions corresponding to the reference membrane portions.

17. A method of making a pressure sensor, comprising:
forming a first set of electrodes overlying an insulative surface;
forming a second set of electrodes overlying the insulative surface, the second set of electrodes being configured in an interleaved arrangement with the first set of electrodes, wherein a geometry of individual electrodes of the first set of electrodes substantially matches a geometry of individual electrodes of the second set of electrodes; and
forming a common electrode (i) overlying, (ii) spaced from, and (iii) configured in connection with the first and second sets of electrodes to form a common pressure cavity, wherein the common electrode includes first portions corresponding to sense membrane portions and second portions corresponding to reference membrane portions, further wherein an area of a sense membrane portion is greater than an area of a reference membrane portion.

18. The method of claim 17, wherein forming the first and second sets of electrodes comprises configuring the first and second sets of electrodes in a layout including an axis of substantial symmetry extending along one dimension of the common electrode and repeating a pattern of the first and second sets of electrodes along another dimension of the common electrode.

19. The method of claim 18, wherein prior to forming the common electrode, the method further comprises:

forming a first conductive runner electrically coupled to the first set of electrodes overlying the insulative surface; and forming a second conductive runner electrically coupled to the second set of electrodes overlying the insulative surface, wherein a geometry of the first conductive runner substantially matches a geometry of the second conductive runner, further wherein the first and second conductive runners extend in a direction parallel to the axis of substantial symmetry.

20. The method of claim 19, wherein forming the common electrode further includes anchoring the common electrode to the insulative surface for establishing (i) the first portions corresponding to the sense membrane portions and (ii) the second portions corresponding to the reference membrane portions.

* * * * *